May 19, 1970 J. A. ALTONJI ET AL 3,513,458

MAGNETIC STORAGE TAPE CARTRIDGE

Filed Sept. 13, 1966 7 Sheets-Sheet 1

INVENTORS
John A. Altonji &
Joseph G. Vaiana

BY Lane, Aitken, Dunner & Ziems
ATTORNEYS

MAGNETIC STORAGE TAPE CARTRIDGE

Filed Sept. 13, 1966 7 Sheets-Sheet 2

INVENTORS
John A. Altonji &
Joseph G. Vaiana

BY
Lane, Aitken, Dunner & Ziems
ATTORNEYS

MAGNETIC STORAGE TAPE CARTRIDGE

Filed Sept. 13, 1966 7 Sheets-Sheet 3

INVENTORS
John A. Altonji &
BY Joseph G. Vaiana
Lane, Aitken, Dunner & Ziems
ATTORNEYS INVENTORS
John A. Altonji &
BY Joseph G. Vaiana
Lane, Aitken, Dunner & Ziems
ATTORNEYS INVENTORS
John A. Altonji &
Joseph G. Vaiana BY Lane, Aitken, Dunner & Ziems
ATTORNEY

MAGNETIC STORAGE TAPE CARTRIDGE

Filed Sept. 13, 1966

INVENTORS
John A. Altonji &
Joseph G. Vaiana
BY
Lane, Aitken, Dunner & Ziems
ATTORNEYS

MAGNETIC STORAGE TAPE CARTRIDGE

Filed Sept. 13, 1966 7 Sheets-Sheet 7

INVENTORS
John A. Altonji &
Joseph G. Vaiana
BY
Lane, Aitken, Dunner & Ziems
ATTORNEYS

United States Patent Office 3,513,458
Patented May 19, 1970

3,513,458

MAGNETIC STORAGE TAPE CARTRIDGE

John A. Altonji, Syosset, and Joseph G. Vaiana, Levittown, N.Y., assignors to Potter Instrument Company, Inc., Plainview, N.Y., a corporation of New York Filed Sept. 13, 1966, Ser. No. 579,049
Int. Cl. G11b *1/02, 15/66, 23/06*
U.S. Cl. 340—174.1 15 Claims

ABSTRACT OF THE DISCLOSURE

A cartridge for magnetic storage tape loops including an outer casing in which at least one pair of upper and lower tape loop supporting members or turn-arounds is positioned to support the tape loops in a vertically oriented oblong configuration, the turn-arounds being movable from an initial storage position in which a slight tension is imposed on the tape loops, to an operative transducing position in which the tape loop tension is relieved when the cartridge is placed onto a memory apparatus. The outwardly facing surfaces on the turn-arounds are smoothly rounded or generally semi-cylindrical to facilitate support of the tape loops during operation on an air bearing whereas the inwardly facing surfaces of the turn-arounds are generally planar and function to position the turn-arounds relative to mating surfaces on the memory apparatus independently of the casing.

This invention relates to magnetic storage tape cartridges, and more particularly, it concerns a cartridge for supporting and housing magnetic tape loops on which transducing operations are performed by a random access memory apparatus of the type disclosed in co-pending application Ser. No. 535,747, filed Mar. 21, 1966, by Andrew Gabor and assigned to the assignee of the present invention.

Generally, the apparatus disclosed in the aforementioned co-pending application operates to store information on a plurality of magnetic tape loops carried in a cartridge which is interchangeable with other cartridges containing additional tape loops. The tape loops of the cartridge, in use, are driven relative to a transducing head assembly which, in turn, is selectively positionable so that transducer heads carried thereon are registered with information tracks on the respective tape loops. The speeds at which the tape loops are driven during transducing operations are extremely high and, as a result, require that the tape loops float aerodynamically throughout their paths of travel during operation. Also, the large number of closely spaced recording tracks on the respective tape loops require accurate positioning of the loops relative to the transducer heads of the memory apparatus. It will be apparent, therefore, that the cartridges in which the tape loops are stored and housed must lend themselves not only to the requirement of this storing or housing function, but also that they facilitate proper orientation of the tape loops relative to the transducing heads during operation.

In accordance with the present invention, a tape cartridge is provided which includes an outer casing in which at least one pair of upper and lower tape supporting members or turn-arounds is positioned to support the tape loops in a vertically oriented oblong configuration. The turn-arounds are supported for movement from an initial or storage position, in which a slight tension is imposed on the tape loops, to an operative transducing position, relieving this tension, when the cartridge is placed onto memory apparatus. Also, each of the turn-arounds is provided with a smooth rounded or semi-cylindrical surface apertured to an interior air chamber to facilitate a transition between the storage position, wherein the tapes are supported mechanically on the turn-arounds, and the transducing position in which the tapes are supported, as aforementioned, aerodynamically or on an air bearing.

Among the objects of the present invention are: the provision of tape cartridges which meet the requirements for protecting the tape loops during storage and handling together with facilitating movement of the tape loops into operative relationship with the transducing head of a random access storage device; the provision of a cartridge assembly which is highly resistant to rough handling; the provision of a light-weight tape cartridge capable of stacked storage in a minimum space; and the provision of a tape cartridge of the type referred to in which the tape loops are inherently protected against deformation and damage by shock and vibration.

Other objects and further scope of applicability of the present invention will become apparent from the detailed description to follow taken in conjunction with the accompanying drawings in which.

Figure 1:
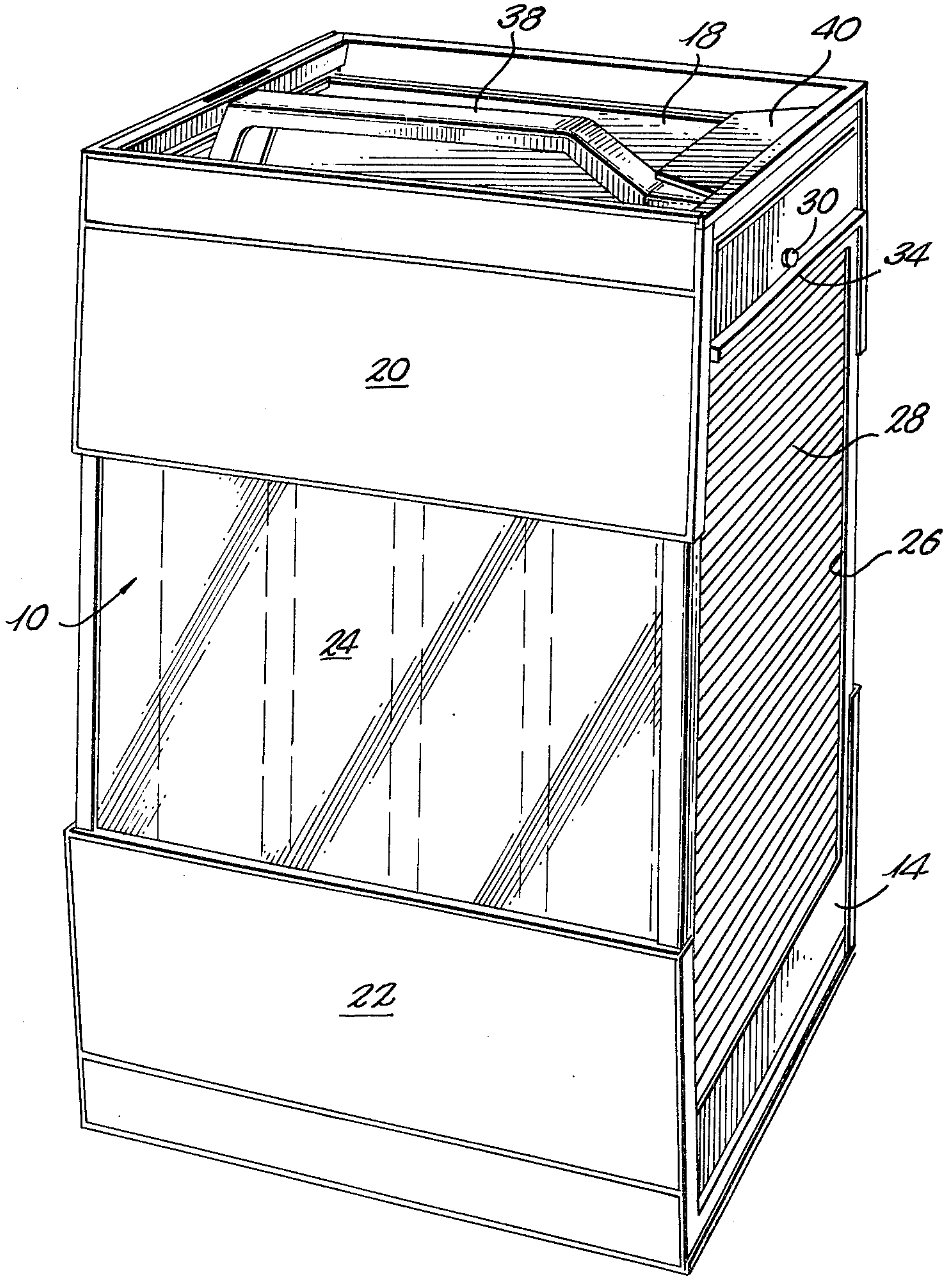
FIG. 1 is a perspective view of the tape cartridge of this invention in condition for storing tapes.
Figure 2:
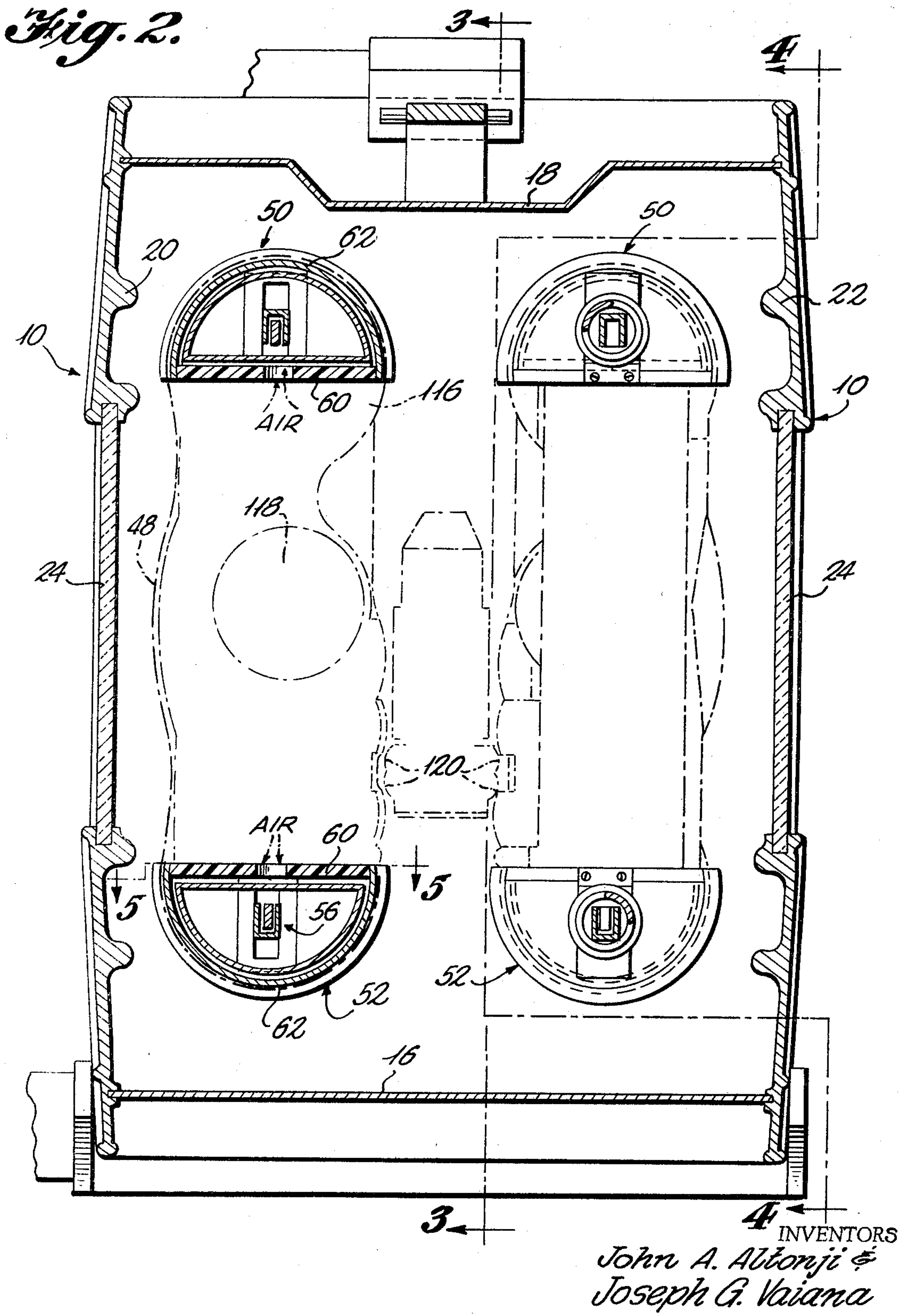
FIG. 2 is a vertical cross-section taken transversely through the tape cartridge of this invention during transducing operations on a memory apparatus shown partly in phantom lines.
Figure 3:
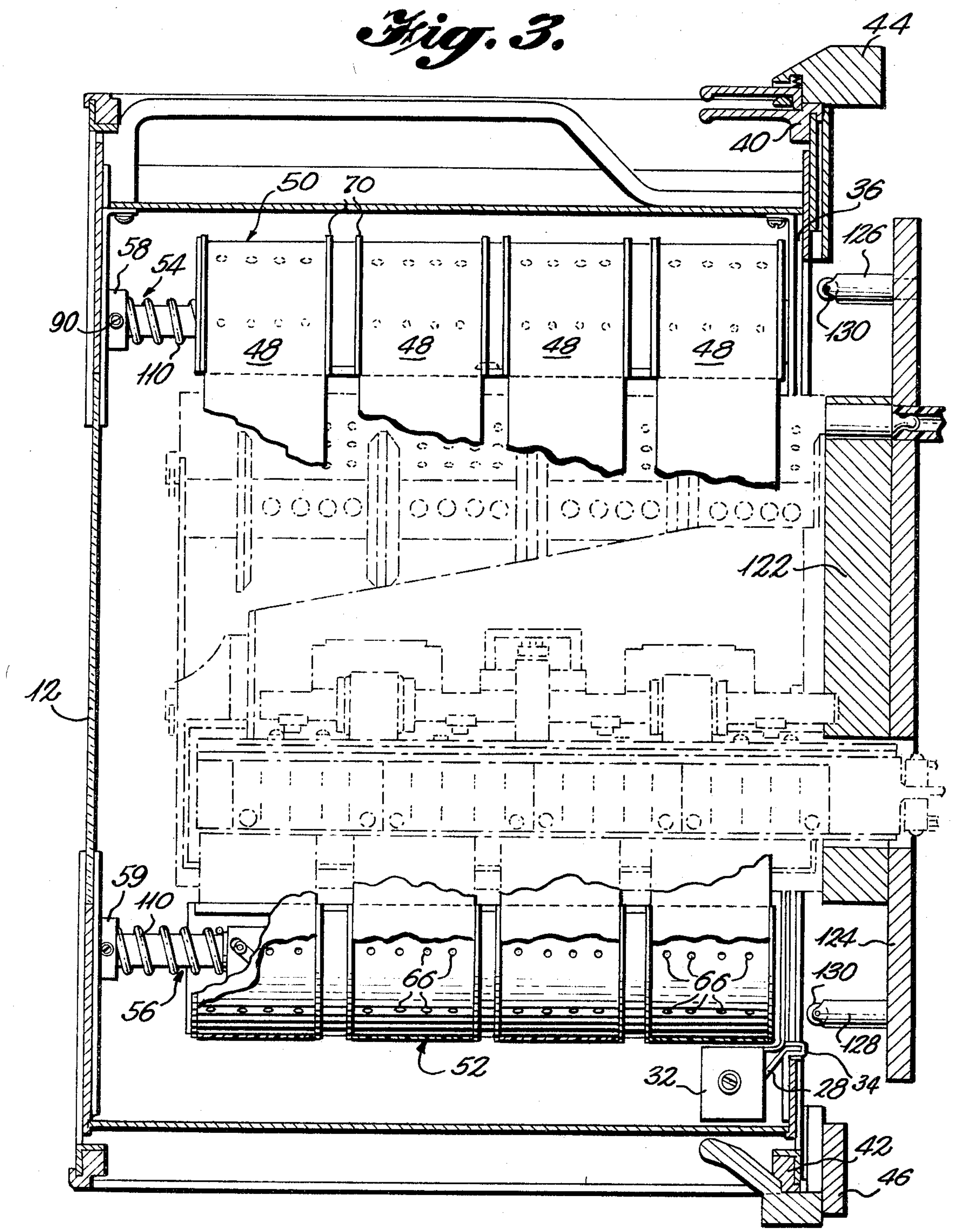
FIG. 3 is a cross-section taken on line 3—3 of FIG. 2.

As shown in the drawings, and particularly in FIGS. 1 to 3 thereof, the cartridge of this invention includes an outer casing defined by a pair of side walls 10, a rear wall 12, a front wall 14, a floor or bottom wall 16, and a top wall 18. The sidewalls 10 are further characterized as having a pair of upper and lower panels 20 and 22, preferably formed of aluminum or other light metal castings, and carrying a centrally disposed transparent window 24. The front wall 14 is provided with an opening 26 adapted to be closed during storage by a flexible door 28. The door 28 is moved between a closed position as shown in FIG. 1, where it is adapted to be latched by suitable means such as a detent latch 30 and a retracted position within a suitable roll-type housing 32 positioned behind the lower portion of the front wall 14. A strip 34 is secured to the leading edge of the door 28 to facilitate manually grasping and elevating the door in a grooved track 36 appropriately formed along the side edges of the opening 26. The top wall 18 of the casing is provided with a dropped central portion to receive a handle 38 which projects upwardly to a point slightly below the plane established by the top of the front, side and rear walls to facilitate stacking during storage. Also, a pair of cleats 40 and 42 are provided along the upper and lower edges, respectively, of the front wall so that the entire cartridge may be supported by arms 44 and 46 of a carriage mechanism (not shown).

The embodiment of the cartridge of this invention illustrated in the drawings is adapted to support two sets of four endless tape loops, or a total of 8 such tape loops, each designated by the reference numeral 48 in the drawings. It is contemplated, however, that the precise number of tape loops may be varied, depending upon the particular memory apparatus with which the cartridge is to be used, without departing from the present invention. Each of the two sets of tape loops 48 is supported on a pair of spaced upper and lower turn-arounds 50 and 52, respectively. The construction of each of the turn-arounds is identical and, also, each is movably supported within the cartridge casing on rod assemblies 54 and 56 cantilevered, respectively, from upper and lower brackets 58 and 59 secured to the rear wall 12.

Although a detailed description of the structure of each turn-around will be given below, it might be noted at this point, with reference to FIGS. 2–4, that each pair of upper and lower turn-arounds which supports a set of tapes 48 includes mutually facing planar surfaces 60 and mutually opposed semi-cylindrical surfaces 62. Hence, when the turn-arounds are maintained in the positions shown, for example, in FIG. 3 of the drawings, the tapes 48 are maintained in a substantially vertically oriented oblong configuration.

A complete understanding of the construction of each of the turn-arounds 50 and 52 may be had by reference to FIGS. 5 to 10 of the drawings. As shown, the surface 62 is established by the generally arcuate or semi-cylindrical outer shell 64 having apertures 66 formed therein. Also, the outer shell is formed with axially spaced sets of grooves 68 to receive tape edge ring guiding segments 70. The precise number of grooves 68 and segments 70, as well as their relative axial positions, may be varied depending on the number and width of tape loops employed. The outer shell is received over an imperforate inner shell 72. The inner shell has an end flange 74 and an annular shoulder 76 so that the outer shell 64, upon resting on the shoulder 76, is spaced from the inner shell 72 to define an annular air chamber 78. The outer and inner shells 64 and 72 are secured to a base plate 80 by any suitable means such as welding, adhesives, screws or the like. A bridge plate 82 is provided on the inner shell to lie against the inner surface of the base plate. The bridge 82 is formed with a channel 84 which defines an air duct extending between an aperture 86 formed in the base plate and the annular air chamber 78 between the inner and outer shells. It will be seen, therefore, particularly in FIGS. 5 and 6 of the drawings, that in the turn-around assembly, the apertures 66 in the outer shell communicate with the aperture 86 in the base plate by way of the chamber 78, and the channel 84.

Figure 4:
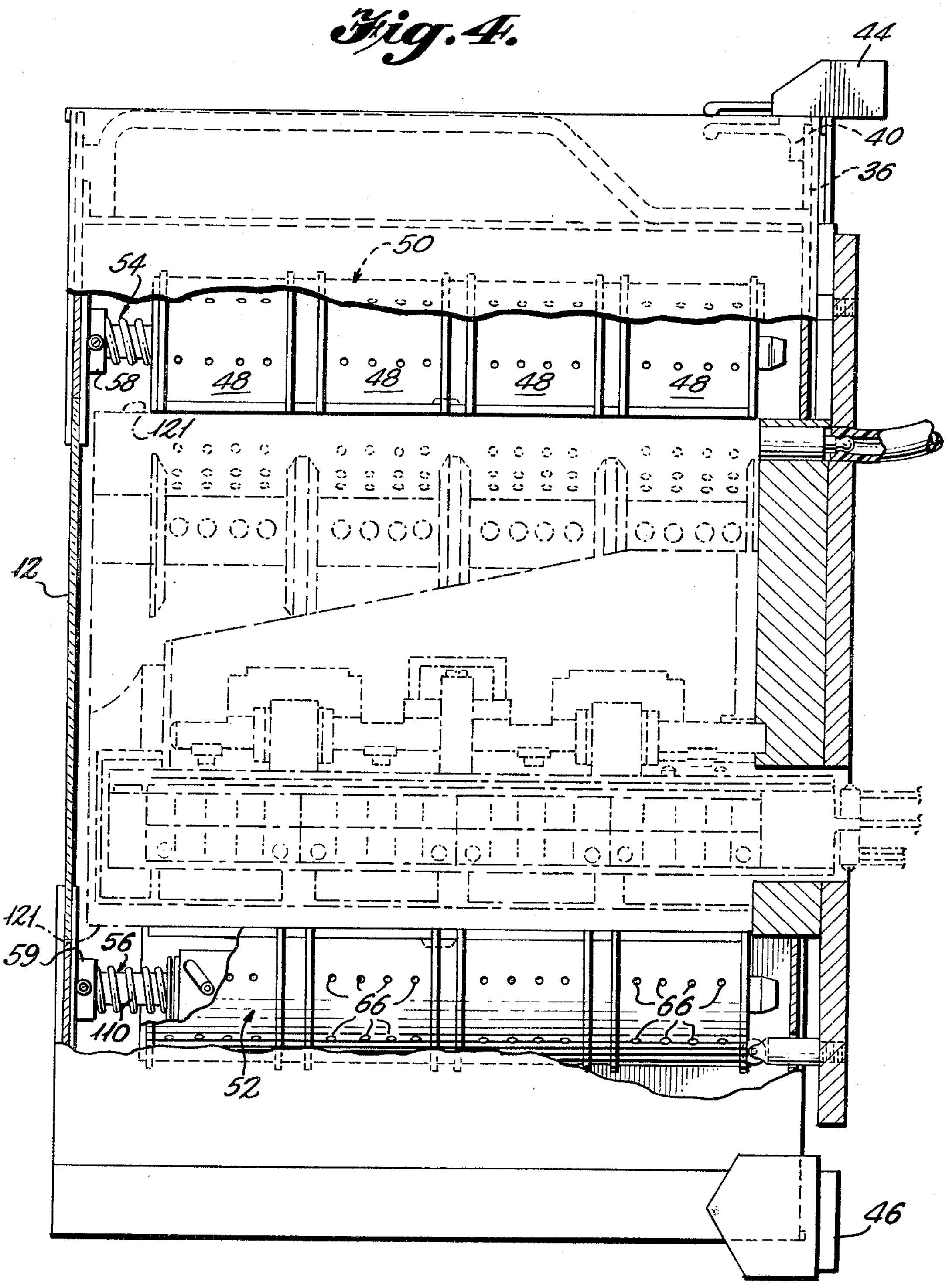
FIG. 4 is a cross-section taken on line 4—4 of FIG. 2.
Figure 5:
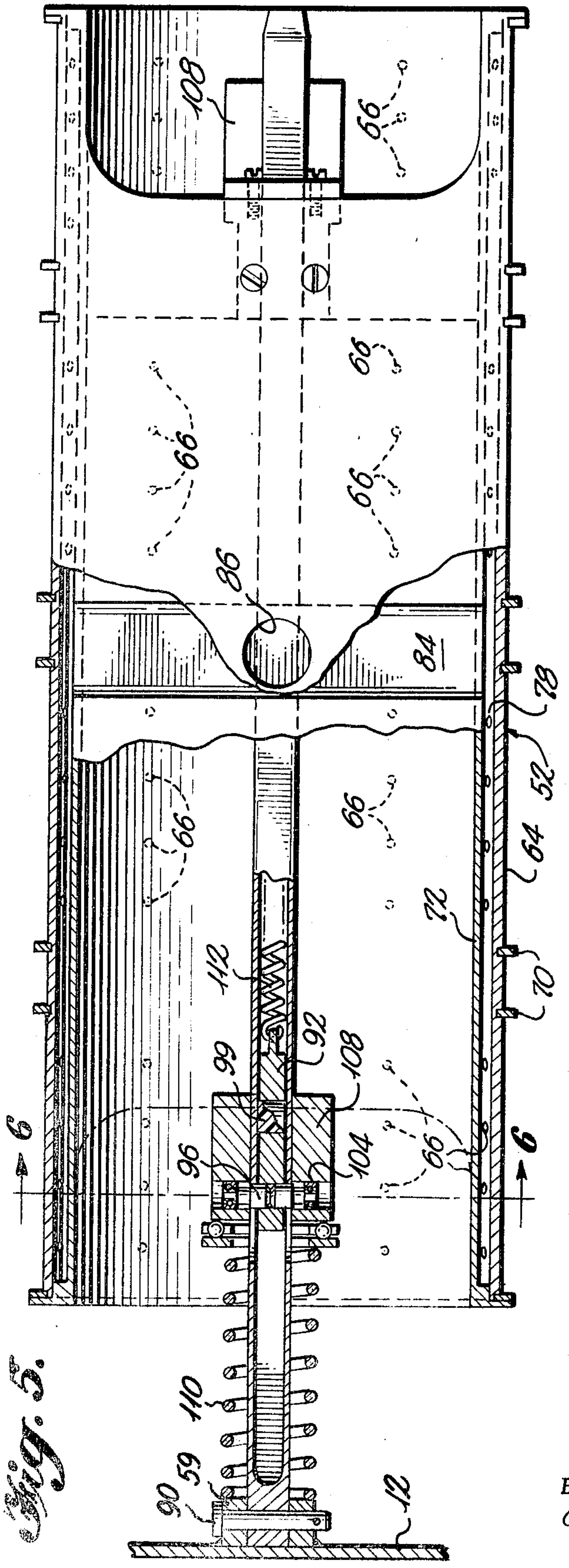
FIG. 5 is an enlarged fragmentary cross-section taken on line 5—5 of FIG. 2.
Figure 9:
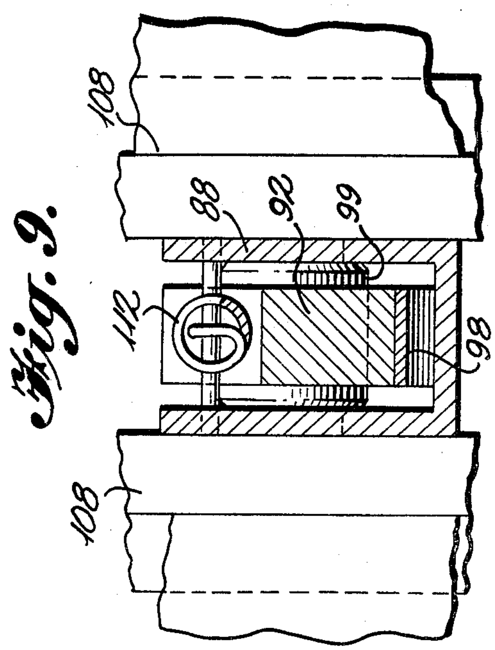
FIG. 9 is an enlarged fragmentary cross-section taken on line 9—9 of FIG. 8.
Figure 6:
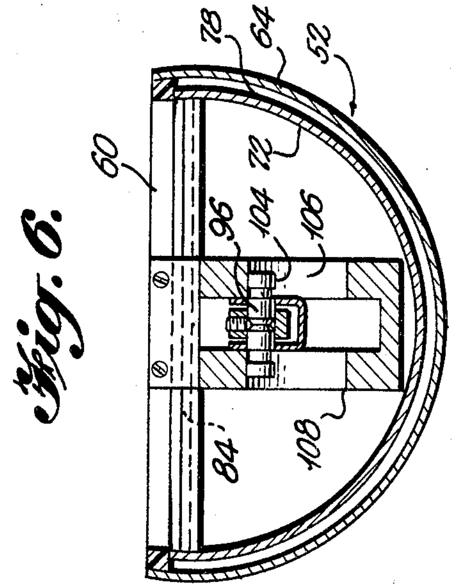
FIG. 6 is a cross-section taken on line 6—6 of FIG. 5.
Figure 7:
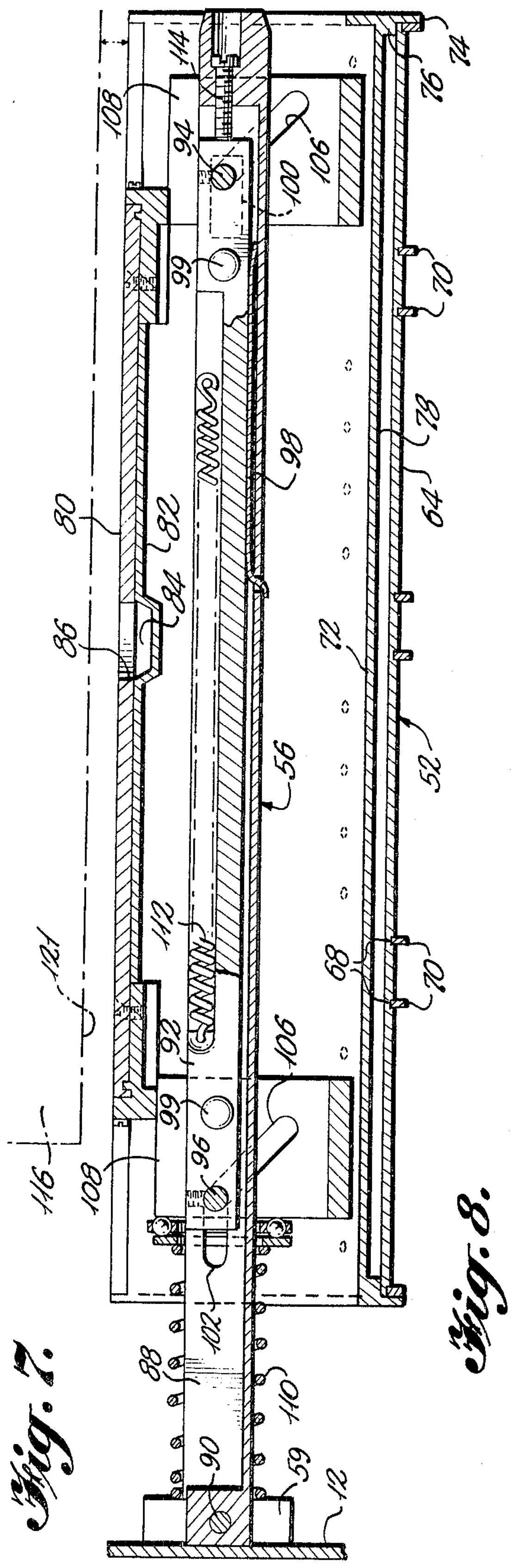
FIG. 7 is a longitudinal section taken centrally through the turn-around illustrated in FIG. 5 of the drawings.
Figure 8:
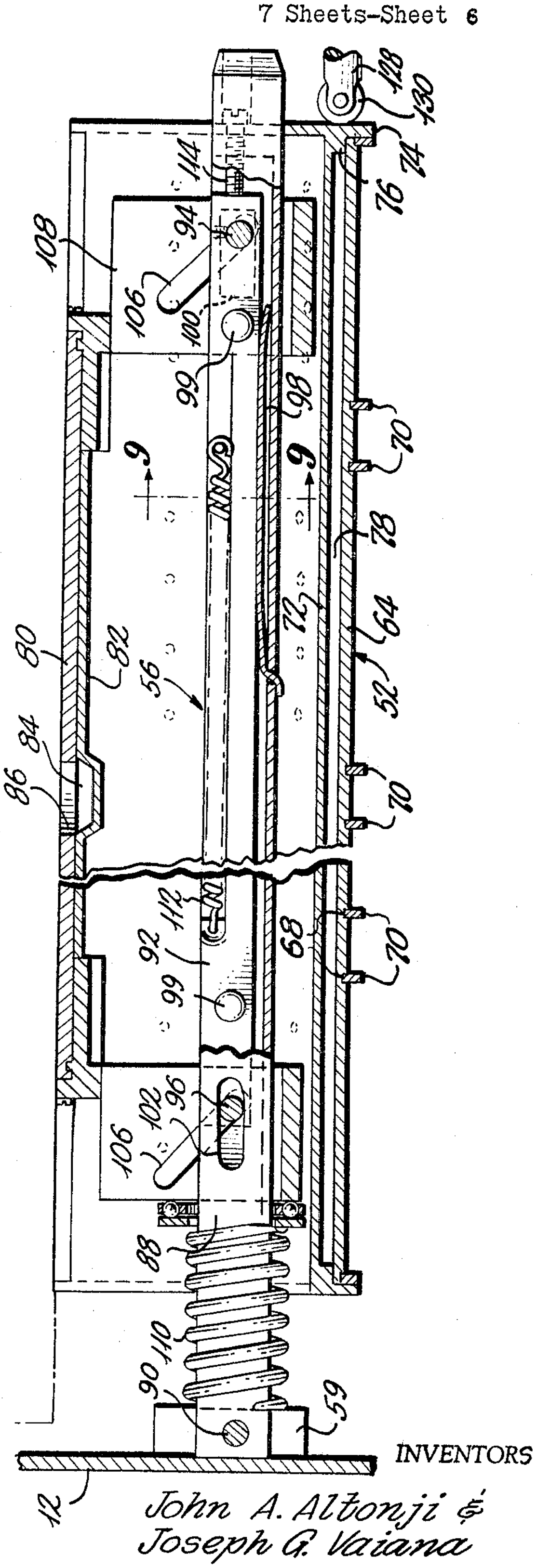
FIG. 8 is a cross-sectional view similar to FIG. 7 but showing the turn-around in another position.
Figure 10:
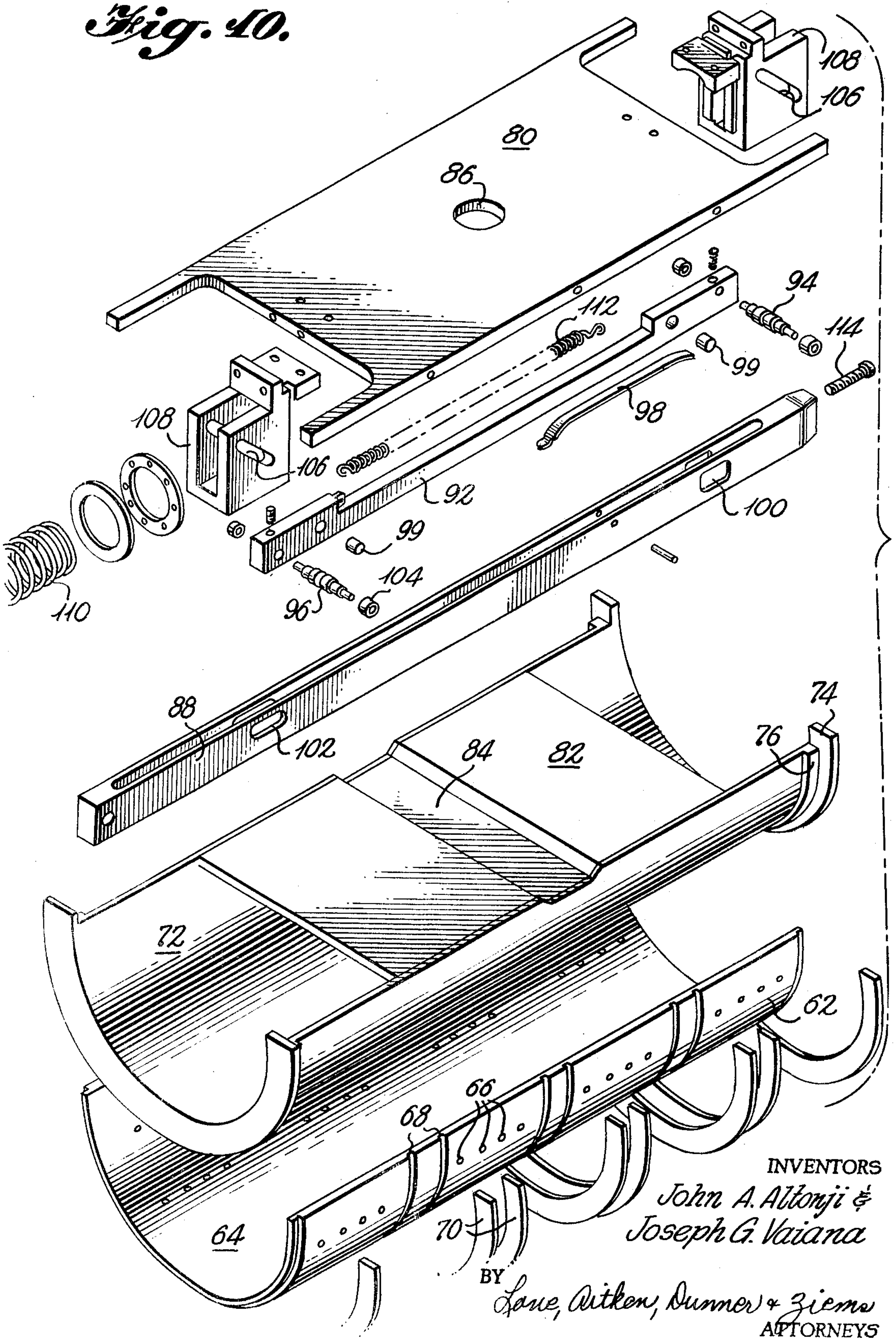
FIG. 10 is an exploded perspective view illustrating the components of a turn-around employed in the cartridge of this invention.

The organization of the rod assemblies 54 and 56 which enable the turn-arounds 50 and 52 to be moved from a storage position, such as that shown in FIG. 3 of the drawings, to an operative transducing position, as depicted by FIGS. 2 and 4 of the drawings, is shown most clearly in FIGS. 7, 8 and 10 of the drawings. As shown, this assembly includes a channel-shaped mounting bar 88 cantileveler from the bracket 59 by the mounting pin 90. A tie bar 92, carrying front and rear transverse pins 94 and 96, respectively, is slidably received within the channel member 88 over a bow spring 98 positioned toward the front of the assembly. A pair of plugs 99 extend through the tie bar 92 and engage the side walls of the channel member. These plugs are formed of nylon or other suitable low friction material to facilitate free sliding movement of the tie bar within the channel member. When the tie bar is thus received within the channel member, the transverse pins 94 and 96 extend respectively through slots 100 and 102 in the side walls within the channel member. The width of the slot 102 is approximately the same as the diameter of the pin 96 whereas the slot 100 is slightly wider than the corresponding diameter of the pin 94. Also, and for reasons which will become more apparent from the description given below, the increased width in the slot 100 moves the upper edge (as viewed in FIGS. 7 and 8) of the slot 100 toward the upper edge of the channel member. Because of this arrangement, the bow spring 98 will tend to cant the tie bar slightly out of parallelism with respect to the channel member 88.

Each of the pins 94 and 96 carry ball bearing rollers 104 on opposite ends to engage in inclined slots 106 provided within cam blocks 108. The cam blocks are received over the assembly of the channel member 88 and tie bar 92, and are secured to the base plate 80 of each turn-around by the suitable means such as screws. By virtue of this arrangement, it will be appreciated that any longitudinal movement of the turn-arounds, and thus the cam blocks 108 relative to the pins 94 and 96, will effect relative vertical movement of turn-arounds.

In accordance with the cartridge of this invention, the tape loops 48 are maintained under a slight tension during storage by biasing the upper and lower turn-arounds 50 and 52 supporting each set of four tape loops 48 away from each other. To provide this function, a relatively weak biasing spring 110 is interposed between the bracket 58, 59 and the cam block 108 at the rear or inboard end of each turn-around. Also, it will be noted that a relatively heavy override spring 112 is connected between tie bar 92 and the channel member to bias the tie bar against a set screw 114 received in the outboard end of the channel member. Because of the relative strengths of the springs 110 and 112, the override spring 112 merely anchors the tie bar 92 against sliding movements relative to the channel member where no external forces are involved. The spring 110, on the other hand, tends to urge the turn-around forwardly of the channel member and the tie bar so that coaction of the cam slots 106 with the pins 94 and 96 move the lower turn-around 52 downwardly and the upper turn-around 50 upwardly into the storage position. This position is assumed by the turn-arounds as shown in FIGS. 3 and 7 of the drawings.

As aforementioned, the cartridge of this invention is intended principally for use with information storage apparatus of the type disclosed in co-pending application Ser. No. 535,747, filed Mar. 21, 1966. Since the structural details of such apparatus are available in this co-pending application, these details will not be described herein. In order to provide a basis for a clear understanding of the manner in which the cartridge of the present invention operates, however, it will be noted by reference to FIGS. 2 to 4 of the drawings that the cartridge is received over a pair of fixed drive blocks 116, each equipped with a capstan 118 and positioned on opposite sides of a transducing head assembly 120, all of which is shown in phantom lines in these figures. Also, it will be noted that each drive block is formed with substantially planar surfaces 121 at their tops and bottoms. The drive blocks 116 and the transducing head assembly 120 are supported from a mounting block 122 fixed to a plate or apron 124 on the storage apparatus. Pairs of upper and lower fingers 126 and 128 are positioned on the apron to engage the front face of the flange 74 on the turn-arounds, in the embodiment shown, as the cartridge is moved onto the storage apparatus by a carriage mechanism including the arms 44 and 46. The fingers 126 and 128 each have a roller 130 on their projecting end to minimize friction between the end of the fingers and the turn-arounds.

The manner in which the turn-arounds 50 and 52 are moved from a storage position to a transducing position may be understood by reference to FIGS. 3, 4, 7 and 8 of the drawings, it being understood that the door 28 is opened prior to this operation. As shown in FIGS. 3 and 7, the turn-arounds 50 and 52 are urged away from each other by coaction of the springs 110, the pins 94 and 96 and the cam slots 106 in the blocks 108 to impose a slight tension on the tape loops 48 and to retain the loops in a uniform oblong path. As the cartridges are then carried toward the apron 124, the front face of the flange 74 on each turn-around engages a roller 130 on a corresponding finger 128 prior to complete movement of the cartridge into a transducing position. Further movement of the cartridge toward the apron 124 causes the spring 110 associated with each turn-around to be compressed, thereby resulting in relative horizontal or longitudinal movement between the pins 94 and 96 and the inclined cam slots 106 to move the upper turn-arounds 50 downwardly and the lower turn-arounds 52 upwardly until the planar surfaces 60 on each of the turn-arounds comes into firm engagement with the upper and lower surfaces 121 of the drive blocks 116. After the turn-arounds contact the drive blocks the cartridge continues to move approximately another one-eighth of an inch to its final transducing position. The connection of the tie bars 92 to the channel members 88 by way of the override spring 112 permits further longitudinal movement of the cartridge to occur without any further attendant vertical movement. Also at this point, it will be noted that the axes of the channel members 88 are displaced from the respective fingers 128 carried on the apron 124. As a result of this displacement, a force couple is developed as soon as the spring 110 of each turn-around becomes stressed. This force couple is compensated for by the tendency of the bow spring 98 to urge the forward end of the tie bar 92 upwardly so that the pin 94 tries to move toward the upper edge of the slot 100. Hence the stresses imparted by the force couple referred to, tending to move the turn-arounds out of parallelism with the drive block, are offset by the action of the bow spring 98.

As described in the aforementioned co-pending application, the drive blocks 116 are equipped with appropriate pressure and vacuum ducts for purposes of developing both air bearing on which the tapes 48 ride during the transducing operations and also to draw the tapes 48 into frictional contact with the capstans 118. It will be appreciated therefore that the port 86 at the bottom of each turn-around comes into registry with a port (not shown) in the drive block 116 so that when the turn-arounds reach the transducing position, air supplied to the drive block 116 is fed through the aperture 86 and to the chamber 78 to provide an air bearing over the cylindrical surface 62 in each turn-around.

Also, it will be noted by reference to FIG. 2 of the drawings that when the turn-arounds 50 and 52 have moved toward one another to engage the planar surfaces of the top and bottom of each drive block 116, the tape loops become slack so that they may be drawn into the configuration illustrated on the left-hand side of FIG. 2 for movement with respect to the transducing heads 120 at exceedingly high speeds.

Thus it will be appreciated that the present invention provides an extremely effective cartridge for storing and handling closed loops of magnetic tapes usable in information storage operations and by which the aforementioned objectives, among others, are completely fulfilled. It will be appreciated also that since many modifications in the cartridge of this invention will be apparent to those skilled in the art, the description given herein is illustrative of a preferred embodiment only, not limiting, and that the true scope and spirit of the present invention will be governed by the appended claims.

The invention claimed is:

1. A cartridge adapted to be mounted on a memory apparatus to perform transducing operations on at least one tape loop carried by the cartridge, said cartridge comprising: a casing, at least two spaced turn-arounds in said casing having outwardly facing rounded surfaces for engaging the inner surface of the tape loop, and inwardly facing generally planar surfaces adapted to engage turn-around positioning surfaces on the memory apparatus for locating said turn-arounds in a precise transducing position on the memory apparatus independently of said casing, and means in said casing to movably support and guide said turn-arounds between a storage position in which the turn-arounds are spaced to hold the tape loops in a uniform oblong path and said transducing position in which said turn-arounds are positioned closer to each other so that the tape loop may be drawn out of said uniform oblong path for transducing operation, said support and guide means including rod means fixed to said casing and extending longitudinally of each of said turn-arounds, and cam means operable upon relative movement between said rod means and said turn-arounds to move said turn-arounds between said positions.

2. The apparatus recited in claim 1 including spring means to bias said turn-arounds to said storage position.

3. The apparatus recited in claim 1 in which said cam means includes means secured on said turn-arounds defining a pair of parallel inclined slots positioned toward the respective ends of each turn-around and a pair of pins engageable in said slots, said pins being carried by said rod means.

4. The apparatus recited in claim 3 in which said rod means is an assembly including a fixed member mounted directly on said casing, a slide member movably carried on said fixed member, said pins being fixed to said slide member, stop means on said fixed member, and resilient means normally holding said slide member against said stop means but yieldable under external forces to permit movement of said slide member from said stop.

5. The apparatus recited in claim 4 including further relatively weak spring means acting between said fixed member and said turn-around in said storage position, and abutment means on said turn-around adapted to engage projecting means on the memory apparatus so that movement of the cartridge during loading on the memory apparatus effects relative movement of said turn-around and said fixed member after engagement of said abutment means to move the turn-arounds to said transducing position.

6. The apparatus recited in claim 5 in which said abutment means is offset from the axis of said further spring means and including means to compensate for force couples which develop as a result of this offset.

7. The apparatus recited in claim 4 in which said fixed member is channel-shaped and having slots formed in the walls thereof through which said pins project.

8. The apparatus recited in claim 1 in which each of said turn-arounds includes an outer, semicylindrical, perforated shell, an inner shell to define an annular air chamber adjacent the inner surface of said outer shell, and means defining a substantially closed air path between said chamber and said planar surface.

9. The apparatus recited in claim 1 in which said casing includes a rear wall and a front wall having an opening therein and in which said support means is cantilevered from said rear wall so that said turn-arounds project toward said opening.

10. The apparatus recited in claim 9 including door means movable to close said opening during storage.

11. The apparatus recited in claim 1 in which said casing includes complementary top and bottom walls to permit stacking.

12. The apparatus recited in claim 11 including a carrying handle in said top wall, said handle being located in a recess defined by peripheral walls extending upwardly above said top wall.

13. The apparatus recited in claim 11 in which said casing includes transparent side walls to facilitate inspection of the tape loops.

14. The apparatus recited in claim 1 including axially spaced tape guide means on said rounded surfaces to position a plurality of separate tape loops on said turn-arounds.

15. The apparatus recited in claim 14 including two pairs of said spaced turn-arounds.

References Cited

UNITED STATES PATENTS 3,315,861 4/1967 Metzger ----------- 340—174.1

BERNARD KONICK, Primary Examiner

W. F. WHITE, Assistant Examiner

U.S. Cl. X.R.

179—100.2